US008239911B1

(12) United States Patent
Sun

(10) Patent No.: US 8,239,911 B1
(45) Date of Patent: Aug. 7, 2012

(54) VIDEO BURSTING BASED UPON MOBILE DEVICE PATH

(75) Inventor: Yaojun Sun, South Riding, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 692 days.

(21) Appl. No.: 12/255,930

(22) Filed: Oct. 22, 2008

(51) Int. Cl.
*H04N 7/173* (2011.01)

(52) U.S. Cl. ............... 725/118; 725/87; 725/97; 725/99

(58) Field of Classification Search ........................ None
See application file for complete search history.

(56) References Cited

U.S. PATENT DOCUMENTS 5,508,754 A * 4/1996 Orphan ......................... 348/722
7,006,881 B1 * 2/2006 Hoffberg et al. ................ 700/83
2007/0005795 A1 * 1/2007 Gonzalez ...................... 709/232

* cited by examiner

*Primary Examiner* — Kieu Oanh T Bui
(74) *Attorney, Agent, or Firm* — O'Brien Jones, PLLC

(57) ABSTRACT

What is disclosed is a method of operating a video system. The method includes determining a projected geographic path of a mobile communication device and determining a transfer schedule for reference frames of a video based on the projected geographic path. The method also includes transferring the reference frames of the video based on the transfer schedule for delivery to the mobile communication device over a wireless communication system and transferring update frames of the video for delivery to the mobile communication device over the wireless communication system without regard to the projected geographic path.

25 Claims, 11 Drawing Sheets

VIDEO BURSTING BASED UPON MOBILE DEVICE PATH

TECHNICAL FIELD

Aspects of the disclosure are related to the field of communications, and in particular, to streaming video over wireless communication networks.

TECHNICAL BACKGROUND

Wireless communication networks typically include mobile communication devices which, via a wireless communication system, communicate with further communication networks and equipment. The wireless communication system typically includes equipment to route communications over wireless links from the mobile communication devices to further communication networks, equipment, and destinations.

Some examples of wireless communication networks allow mobile communication devices to access video content held on video systems through the wireless communication system. These video systems transfer video content to the mobile communication devices utilizing the wireless communication network. However, video content many times requires consistently high wireless communication data bandwidths and relatively strong wireless signals to support the higher bandwidth video content.

Unfortunately, if a mobile communication device is located in a place of poor wireless coverage, or moving through areas of varying wireless coverage, for example, the video content may also suffer and be degraded or experience interruptions in playback. This can lead to a poor user experience due to jumpy or sporadic video content performance.

Overview

What is disclosed is a method of operating a video system. The method includes determining a projected geographic path of a mobile communication device and determining a transfer schedule for reference frames of a video based on the projected geographic path. The method also includes transferring the reference frames of the video based on the transfer schedule for delivery to the mobile communication device over a wireless communication system and transferring update frames of the video for delivery to the mobile communication device over the wireless communication system without regard to the projected geographic path.

What is also disclosed is a method of operating a video system. The method includes, in a video server, receiving a request for a video from a mobile communication device over a wireless communication system, and requesting the video from a media storage system. The method also includes, in the media storage system, processing the request for the video and transferring the video to the video server. The method also includes, in the video server, determining a projected geographic path of the mobile communication device, determining a transfer schedule for reference frames of the video based on the projected geographic path, and transferring the reference frames of the video based on the transfer schedule for delivery to the mobile communication device over the wireless communication system. The method also includes, in the video server, transferring update frames of the video for delivery to the mobile communication device over the wireless communication system without regard to the projected geographic path.

What is also disclosed is a communication system. The communication system includes a video system configured to receive a request for a video from a mobile communication device, determine a projected geographic path of the mobile communication device, and determine a transfer schedule for reference frames of the video based on the projected geographic path. The video system is also configured to transfer the reference frames of the video based on the transfer schedule for delivery to the mobile communication device over a wireless communication system and transfer update frames of the video for delivery to the mobile communication device over the wireless communication system without regard to the projected geographic path. The mobile communication device is configured to receive the video, process the reference frames and the update frames to determine a playback sequence of the video, and display the video in the playback sequence.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
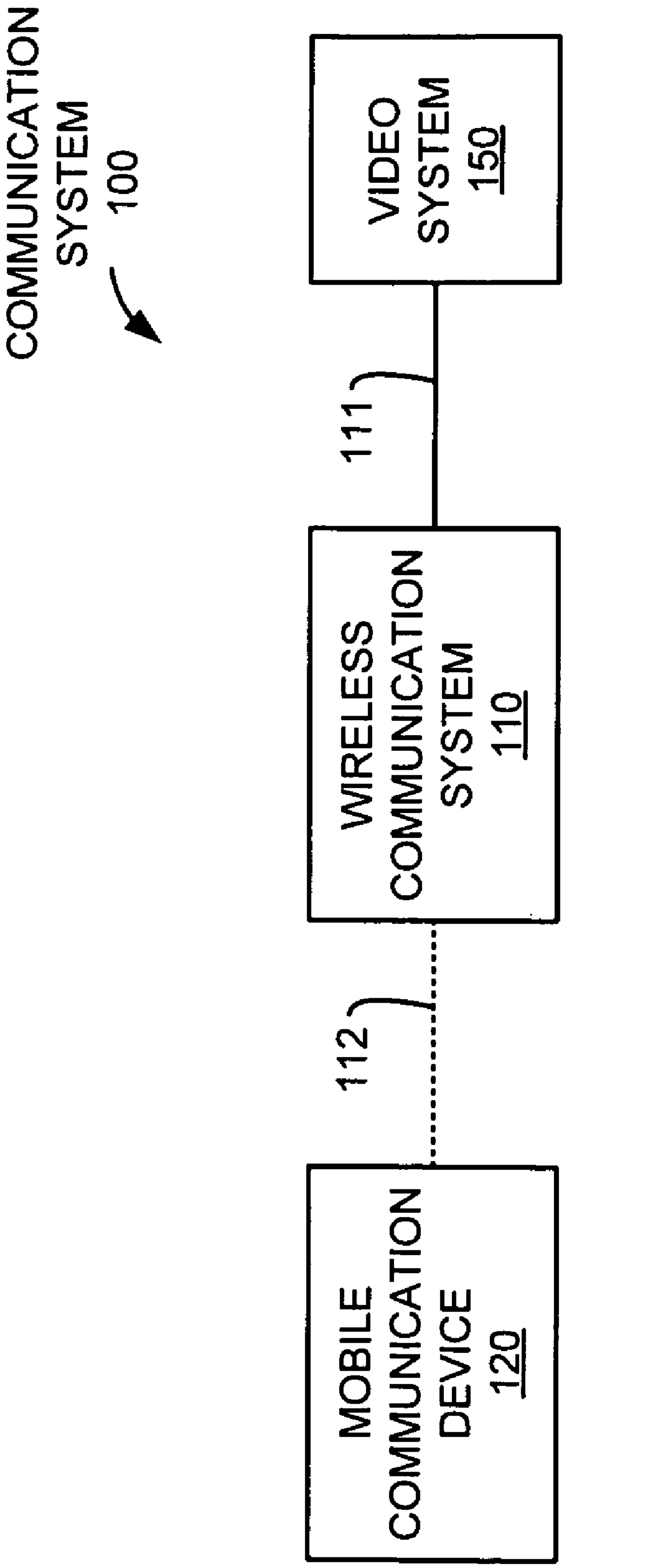
FIG. 1 is a system diagram illustrating a communication system.

FIG. 1 is a system diagram illustrating communication system 100. Communication system 100 includes mobile communication device 120, wireless communication system 110, and video system 150. Mobile communication device 120 and wireless communication system 110 communicate over wireless link 112. Video system 150 and wireless communication system 110 communicate over link 111.

Mobile communication device 120 comprises a telephone, transceiver, computer, digital assistant, smart phone, Internet appliance, or some other wireless communication apparatus—including combinations thereof.

Video system 150 includes equipment capable of serving or streaming video to mobile communication device 120. Examples of video system 150 include video servers, media storage systems, video controllers, computers, processing systems, storage-area networks, network-attached storage systems, or other equipment—including combinations thereof.

Wireless communication system 110 includes wireless communications network equipment capable of communicating with mobile communication device 120. Examples of wireless communication system 110 can include base stations, base transceiver stations, boomer stations, antennas, radio node controllers (RNC), mobile switching controllers, call processing equipment, wireless access points, telephone switches, Internet routers, network gateways, global-positioning system (GPS) receivers, terrestrial position-determining equipment (PDE) systems as well as other type of communication equipment—including combinations thereof.

Wireless link 112 uses various communication media, such as air, space, or some other wireless transport media—including combinations thereof. Wireless link 112 uses various protocols, such as worldwide interoperability for microwave access (WiMAX), long-term evolution (LTE), wireless fidelity (WiFi), code division multiple access (CDMA), global system for mobile communications (GSM), or some other communication format—including combinations or variations thereof.

Wireless link 112 may comprise many different signals sharing the same link. Wireless link 112 could include multiple signals operating in a single "airpath"—as represented by the dashed line in FIG. 1—comprising multiple frequencies, timeslots, transportation ports, logical transportation links, network sockets, IP sockets, packets, or communication directions. For example, communications and control signals between mobile communication device 120 and wireless communication system 110 could share the same wireless link 112, but be transferred over different frequencies, timeslots, packets, ports, sockets, logical transport links, or in different directions—including combinations thereof. In some examples, a logical transport link indicates a logical link at the application layer in a network hierarchy of the communication protocol employed. Examples of transportation ports include Transmission Control Protocol (TCP) ports, User Datagram Protocol (UDP) ports, or other transportation ports.

Link 111 uses various communication media, such as air, space, metal, optical fiber, or some other signal propagation path—including combinations thereof. Link 111 could be wired or wireless and use various communication protocols such as Internet, Internet protocol (IP), local-area network (LAN), optical networking, hybrid fiber coax (HFC), telephony, T1, or some other communication format—including combinations or variations thereof. Link 111 could be a direct link or might include various equipment, intermediate components, systems, and networks. Link 111 could include multiple signals operating in a single pathway in a similar manner as link 112.

Figure 2:
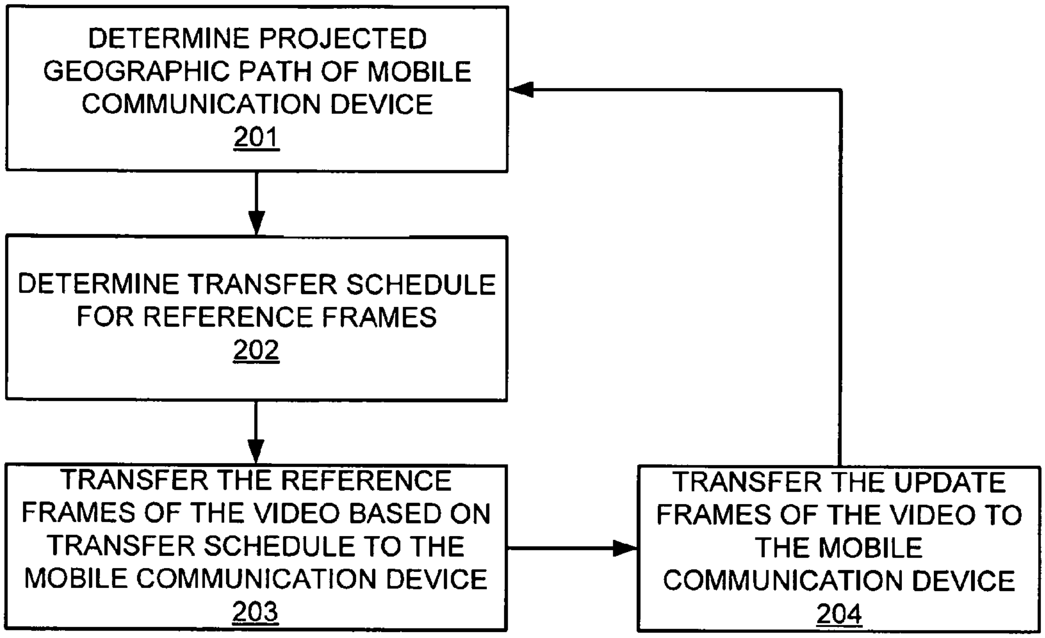
FIG. 2 is a flow diagram illustrating a method of operation of a video system.

FIG. 2 is a flow diagram that illustrates a method of operation of video system 150, as found in FIG. 1. The phases shown in FIG. 2 are indicated herein parenthetically. In FIG. 2, video system 150 determines (201) a projected geographic path of mobile communication device 120.

The projected geographic path of mobile communication device 120 could be determined by many possible methods. In some examples, the projected geographic path of mobile communication device 120 is determined by monitoring a first geographic location of the mobile communication device and monitoring a second geographic location of the mobile communication device. Then, the first geographic location and the second geographic location are processed to determine a traveled path between the first geographic location and the second geographic location. The traveled path is extrapolated to determine the projected geographic path. In other examples, the projected geographic path of mobile communication device 120 is determined by monitoring a geographic location of the mobile communication device and processing the geographic location to determine if the geographic location is associated with a mobility pattern. The projected geographic path of the mobile communication device is then determined based on the mobility pattern.

A mobility pattern defines a pattern of motion of mobile communication device 120, and could be determined using several factors. In some examples, these factors include determining if a geographic location is associated with predetermined routes, such as roads, highways, landmarks, terrain features, or other routes. In other examples, the mobility pattern could be determined by past usage of mobile communication device 120 by checking the geographic location of mobile communication device 120 against historical data associated with mobile communication device 120. Advantageously, a mobility pattern would allow for a determination of a projected geographic path with only one geographic location of mobile communication device 120.

In some examples, video system 150 receives the geographic location of mobile communication device 120 from mobile communication device 120. In other examples, video system 150 requests the geographic location of mobile communication device 120 from wireless communication system 110, possibly from a base station associated with mobile communication device 120. In examples where more than one base station is located within wireless communication system 110, video system 150 may first determine from which base station to request the geographic location of mobile communication device 120. Video system 150 could further query another system in wireless communication system 110 to obtain the geographic location of mobile communication device 120 or to obtain an indicator as to which base station is associated with mobile communication device 120.

In examples where mobile communication device 120 transfers a geographic location to video system 150, mobile communication device 120 could include a global-positioning system (GPS) receiver to enable a determination of geographic location. In other examples, mobile communication device 120 interfaces with external systems to determine a geographic location. In yet other examples, the geographic location of mobile communication device 120 is predetermined and stored in a digital storage medium for later use. In examples where the geographic location is determined by wireless communication system 110, a terrestrial position-determining equipment (PDE) system could be used to determine a geographic location of mobile communication device 120. In other examples, a triangulation method is used, while in yet other examples, an emergency services location procedure system is used. In examples where wireless communication system 110 determines the geographic location of mobile communication device 120, video system 150 could query wireless communication system 110 to obtain the geographic location of mobile communication device 120. In other examples, wireless communication system 110 could transfer the geographic location to video system 150.

Video system 150 also determines (202) a transfer schedule for reference frames of a video based on the projected geographic path of mobile communication device 120. The transfer schedule indicates where or when along the projected geographic path the reference frames should be transferred to mobile communication device 120. Once a projected geographic path has been determined, further processing could reveal expected wireless communication quality along the projected geographic path.

In many examples, the projected geographic path defines a path that passes through regions associated with varying expected quality of wireless communications between mobile communication devices and wireless communication system 110. These regions could include, for example, places of varying bandwidth, signal strength, or could correlate to geographical features which exhibit influence on wireless communications. In some examples, the projected geographic path could pass through geographic regions known to be capable of higher or lower quality wireless communications, as indicated by a bandwidth or a bit rate of communications. In other examples, the projected geographic path could pass through geographic regions of a particular RF signal quality, such as signal strength or noise level, of the wireless communications. In addition to the projected geographic path, other factors may also be monitored. For example, a service-level agreement (SLA) for a user of mobile communication device 120 may dictate differing levels of bandwidth, bit rates, or quality-of-service (QoS) allotted to the user. These SLA concerns could be considered and monitored along with the projected geographic path.

In a typical example, the projected geographic path indicates locations, regions, or path segments where communication device 120 is expected to experience a poor quality of wireless communications. In such an example, the transfer schedule could then coordinate transfer of reference frames of a video during locations determined to have high-quality wireless communications along the projected geographic path, while withholding transfer of the reference frames during locations determined to have poor-quality wireless communications along the projected geographic path.

In some examples, the transfer schedule could be correlated to physical locations or segments along a projected geographic path to transfer reference frames, while in other examples, the transfer schedule could be associated instead with a period of time to transfer reference frames. For example, if the projected geographic path is associated with a constant or predictable speed of mobile communication device 120, the transfer schedule may only indicate time-frames during which reference frames would be transferred or withheld. In this manner, only an initial location would need to be determined for mobile communication device 120, along with a speed of travel of mobile communication device 120 along the projected geographic path to determine a transfer schedule based upon travel time. In some examples where physical locations are correlated along a projected geographic path, the geographic location of mobile communication device 120 could be determined periodically to determine a current geographic location of mobile communication device 120 along the projected geographic path. In other examples, both a time and a physical location, among other factors, are used to determine a transfer schedule.

The reference frames of the video are then transferred (203) based on the transfer schedule to mobile communication device 120 over wireless communication system 110. In some examples, the reference frames could be scheduled to be burst to mobile communication device 120 in a manner more rapid than normal, and possibly out of sequence with update frames of the video, while mobile communication device 120 is in a region of higher quality wireless communications. Mobile communication device 120 could then buffer or cache the reference frames to allow for proper sequencing with the update frames, as discussed below.

Video system 150, concurrently, and without regard to the projected geographic path of mobile communication device 120, transfers (204) the update frames of the video to mobile communication device 120. It should be understood that other conditions on the transfer of the update frames could be utilized, such as when mobile communication device 120 is out of communication range of wireless communication system 110, when mobile communication device 120 is powered off, when faults are detected on wireless link 112 or link 111, among other conditions—including combinations thereof.

Figure 5:
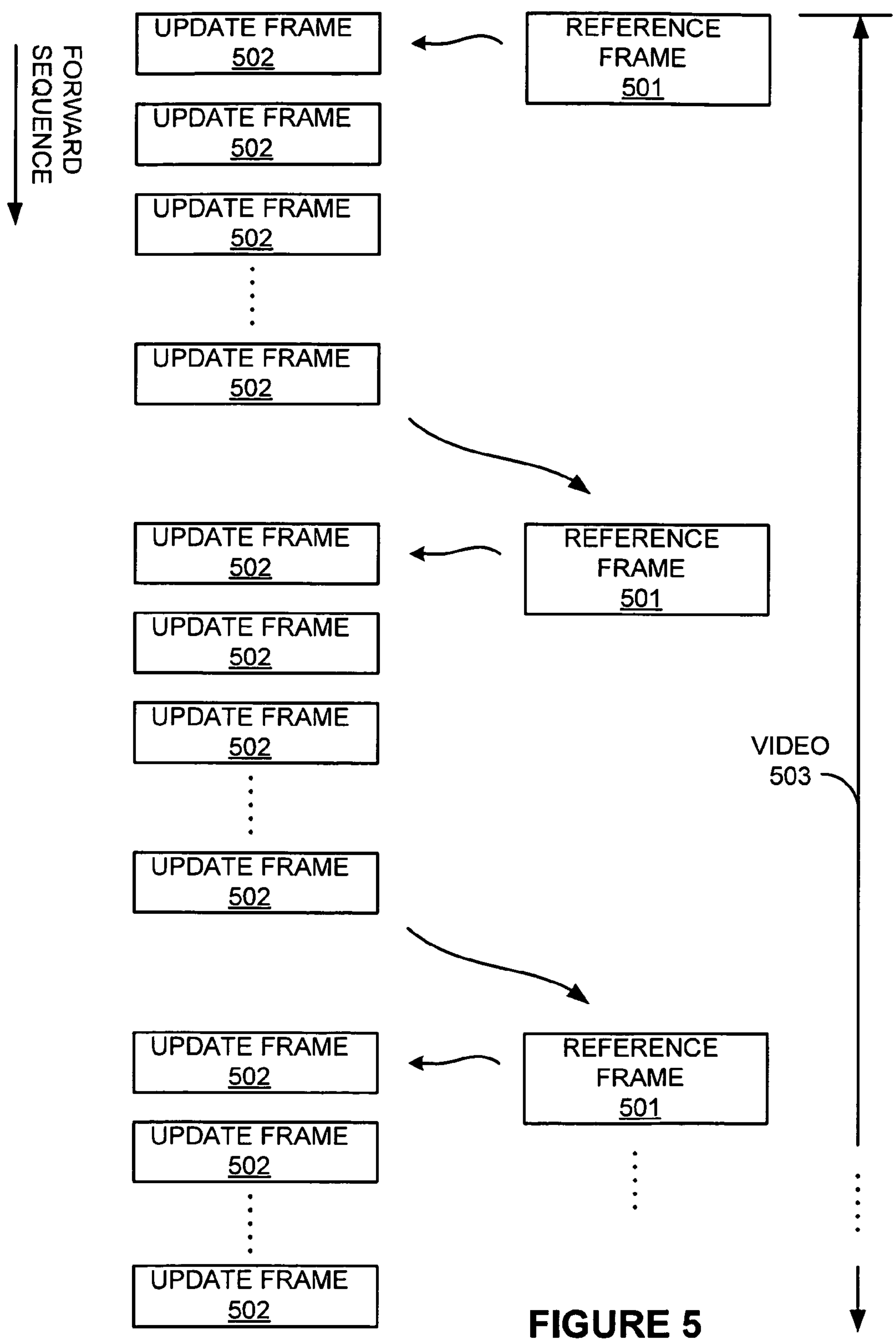
FIG. 5 is a diagram illustrating a sequence of reference frames and update frames of a video.

In further examples of communication system 100, mobile communication device 120 receives the reference frames of the video when transferred by video system 150. Mobile communication device 120 also receives the update frames of the video transferred from video system 150. Mobile communication device 120 then displays both the reference frames and the update frames. Since the reference frames may be received in a burst and a different sequence with respect to the update frames, mobile communication device 120 may need to process the reference frames and the update frames and determine a playback sequence. In some examples, mobile communication device 120 stores the update frames in a buffer or cache while awaiting reference frames. As the reference frames are received, the update frames can then be transferred from the buffer and displayed in the correct sequence with the reference frames. An example of the relationship between reference frames and update frames is illustrated in FIG. 5, and discussed below.

During operation of video system 150, the process described above in phases 201-204 may be repeated throughout the transfer of a video. How frequently video system 150 determines (201) a projected geographic path of mobile communication device 120 will vary depending upon many factors, including the intentions of the operator of video system 150, the quality of video desired to be transferred, the availability of geographic location information, the SLA of the user of mobile communication device 120, the motion or path of mobile communication device 120, a deviation of mobile communication device 620 from a previously projected geographic path, among other factors.

Figure 3:
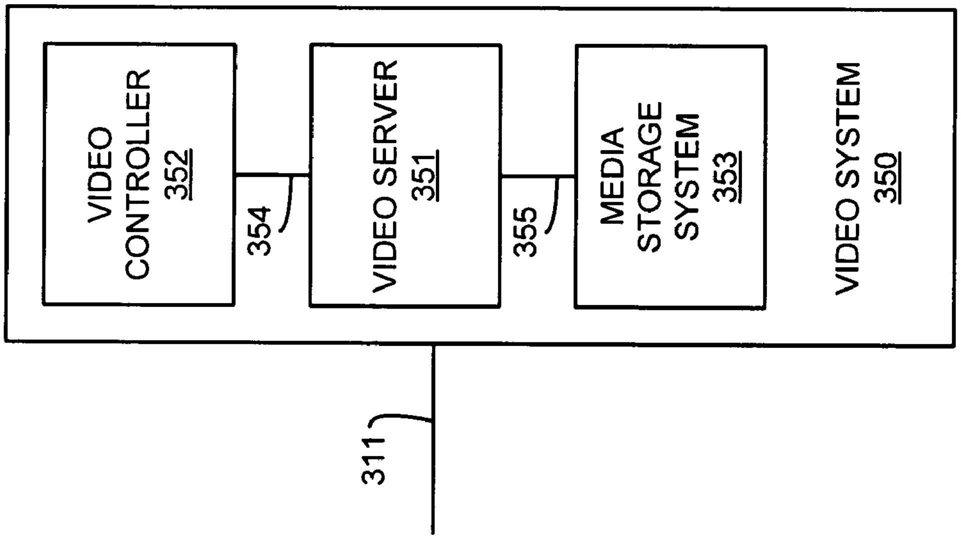
FIG. 3 is a block diagram illustrating an example of a video system.

FIG. 3 is a block diagram illustrating video system 350 as an example of video system 150, as found in FIG. 1, although video system 150 could use other configurations. Video system 350, in this example, includes video server 351, video controller 352, and media storage system 353. Video server 351 and video controller 352 are communicatively linked by link 354. Video server 351 and media storage system 353 are communicatively linked by link 355.

Video server 351 includes processing systems, file servers, video streaming systems, computer systems, or other video serving or streaming equipment, including combinations thereof.

Video controller 352 includes equipment for controlling the operations of video server 351. Video controller 352 could incorporate a computer microprocessor, circuitry, or some other processing device or software system, and may be distributed among multiple processing devices. In some examples, video controller 352 is located within the same equipment as video server 351. Video controller 352 may also include software such as an operating system, logs, utilities, drivers, networking software, and other software which is typically stored on a computer-readable medium.

Media storage system 353 comprises a digital storage system for storing audio-visual media, such as video, images, and other related content. Media storage system 353 could include a computer-readable medium such as a disk, tape, integrated circuit, server, or some other memory device, and also may be distributed among multiple memory devices. In some examples, media storage system 353 comprises a storage-area network (SAN) or network-attached storage (NAS) system which stores a large collection of videos for access over a network interface. In other examples, media storage system 353 could be a temporary buffer system which facilitates the transfer of live video to video server 351.

Links 354-355 comprise physical, logical, or virtual communication links, capable of communicating video data, control signals, along with other information. In some examples, links 354-355 are encapsulated within the elements of video server 351, video controller 352, or media storage system 353 and may be a software or logical link. Links 354-355 use various communication media, such as air, space, metal, optical fiber, or some other signal propagation path—including combinations thereof. Links 354-355 could be wired or wireless and use various communication protocols such as Internet, Internet protocol (IP), local-area network (LAN), optical networking, hybrid fiber coax (HFC), telephony, T1, or some other communication format—including combinations or variations thereof. Links 354-355 could be a direct links or might include various equipment, intermediate components, systems, and networks. Link 311 could be similarly configured to that described for link 111 or for links 354-355, although link 311 could also use other configurations.

Figure 4:
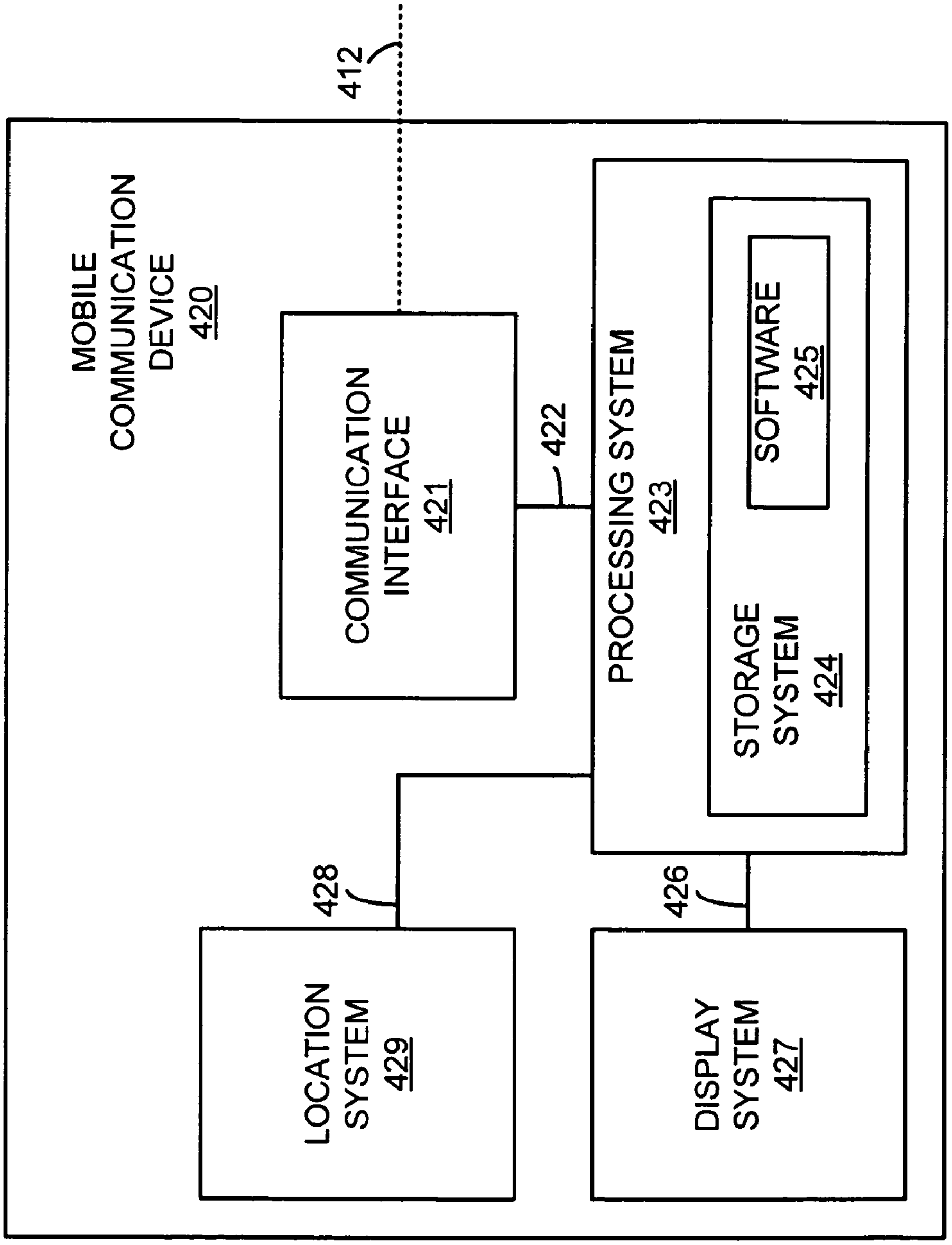
FIG. 4 is a block diagram illustrating an example of a mobile communication device.

FIG. 4 illustrates a block diagram of mobile communication device 420 as an example of mobile communication device 120, as found in FIG. 1, although mobile communication device 120 could use other configurations. Mobile communication device 420, in this example, includes communication interface 421, processing system 423, display system 427, and location system 429. Processing system 423 includes storage system 424. Storage system 424 stores software 425. Processing system 423 is communicatively linked to communication interface 421 by link 422. Processing system 423 is communicatively linked to display system 427 by link 426. Processing system 423 is communicatively linked to location system 429 by link 428. Mobile communication device 420 may be distributed among multiple devices that together form elements 421-427.

Communication interface 421 comprises antennas, transceivers, circuitry, as well as other types of communication components—including combinations thereof.

Processing system 423 retrieves and executes software 425 from storage system 424. Processing system 423 could incorporate a computer microprocessor, logic circuit, or some other processing device, and may be distributed among multiple processing devices. In some examples, processing system 423 is located within the same equipment in which communication interface 421, display system 427, or location system 429 are located. Storage system 424 could include a computer-readable medium such as a disk, tape, buffer, cache, integrated circuit, server, or some other memory device, and also may be distributed among multiple memory devices. Software 425 may include an operating system, logs, utilities, drivers, networking software, and other software typically loaded onto a computer system. Software 425 could contain an application program, firmware, or some other form of computer-readable processing instructions. When executed by processing system 423, software 425 directs processing system 423 to operate as described herein.

Display system 427 includes circuitry and a viewscreen or user display used for viewing video content on mobile communication device 420. In some examples, display system 427 includes a viewscreen integrated into mobile communication device 420, while in other examples, display system 427 may include an interface to a display system external to mobile communication device 420. In many examples, in addition to a viewscreen, a speaker assembly or a headphone adapter is included for listening to audio content accompanying the video.

Location system 429 includes equipment capable of determining a geographic location of mobile communication device 420. Examples of location system 429 include a global-positioning system (GPS) receiver, a terrestrial position determining equipment (PDE) system, a triangulation-based location system, an emergency services location procedure system, or some other type of location determining system, including combinations thereof. Other examples of location system 429 include merely an interface configured to communicate with external equipment capable of determining a geographic location of mobile communication device 420, where location would then be received by location system 429. In another example, location system 429 may be digital storage including the geographic location of mobile communication device 420.

Links 422, 426, and 428 comprise physical, logical, or virtual communication links, capable of communicating data, control signals, and communications, along with other information. In some examples, links 422, 426, and 428 are encapsulated within the elements of communication interface 421, processing system 423, display system 427, or location system 429 and may be a software or logical link. In other examples, links 422, 426, and 428 use various communication media, such as air, space, metal, optical fiber, or some other signal propagation path—including combinations thereof. Links 422, 426, and 428 could be wired or wireless and use various protocols or communication formats as described herein for wireless link 112—including combinations or variations thereof. Links 422, 426, and 428 could be a direct link or it might include various equipment, intermediate components, systems, and networks. Wireless link 412 could be similarly configured to that described for wireless link 112 or for links 422, 426, and 428, although wireless link 412 could also use other configurations.

FIG. 5 is a diagram illustrating a sequence of reference frames 501 and update frames 502 of video 503. Video 503 is comprised of several frames, or time-correlated image elements of a video. These frames, when accumulated in a sequence, correspond to a portion of video 503. In many examples of video 503, several frames are used to comprise one portion, such as one second, of video 503. The length of time of video 503 could be predetermined, as in the example of a fixed-length movie, or could be open-ended, as in the case of streaming newscast or sporting event which may continue indefinitely.

In some examples, such as shown in FIG. 5, reference frame types 501 and update frame types 502 comprise a portion of video 503. Each reference frame 501 is typically a frame type used as a reference or key for an update frame 502. Update frames 502 indicate a change, difference, or delta in the previous frame in a sequence of frames. In many typical examples, reference frames 501 contain much more data than update frame 502, and likewise require much more bandwidth to transfer.

In FIG. 5, reference frames 501 precede a series of update frames 502. Each update frame 502 indicates a change to the previous frame, whether the previous frame is a reference frame 501 or another update frame 502. Several update frames 502 can follow a particular reference frame 501, depending upon the video format used. In some example formats, each reference frame 501 occurs once for every ½ second of video 503, with update frames 502 occurring when a reference frame 501 does not, to establish a total frame rate of 24 or 30 frames per second of video 503. In other examples, more or less frames of each type could comprise each second of video 503.

Reference frames 501 include information relating to an entire visible frame of video, typically comprising enough data to complete an image or picture encompassing the entire viewable portion or scene of a video. This is in contrast to update frames 502, which typically include only a subset of the information that encompasses the entire viewable portion of a video. As mentioned above, the update frames 502 indicate a change from a neighboring frame, where the neighboring frame could be either a reference frames 501 or update frames 502. In this manner, each update frame 502 need only contain a smaller amount of data than a reference frame 501. For example, a video containing a person walking past an unchanging or slowly changing background would typically require the update frames 502 to include information changing from one frame to the next (i.e. information relating to the motion of the person), whereas the reference frames 502 would typically include information encompassing the entire viewable portion of the video (i.e. information relating to the person and the background).

In addition to containing image data, reference frames 501 and update frames 502 can also contain sequencing information relating to a display order and a transmit order. However, a reference frame must be displayed first in order for subsequent update frames 502 to have a baseline or key from which a delta or change can be determined. In many examples, video 503 can be displayed in forward sequence or reverse sequence through a similar use of reference frames 501 and update frames 502.

In examples of compressed video, such as MPEG video, reference frames 501 can include a frame type referred to as intra-frames (I frames), whereas update frames 502 can include several frame types referred to as predicted (P frames) or bidirectional frames (B frames). Several examples variants of MPEG video exist, such as MPEG-1, MPEG-2, or MPEG-4, each incorporating similar principles as discussed herein. Other example video formats include QuickTime, DivX, VCEG, H.264, Windows Media Video (WMV), Ogg Theora, or other compressed video formats, which may follow similar frame utilization principles as found in MPEG.

Figure 6:
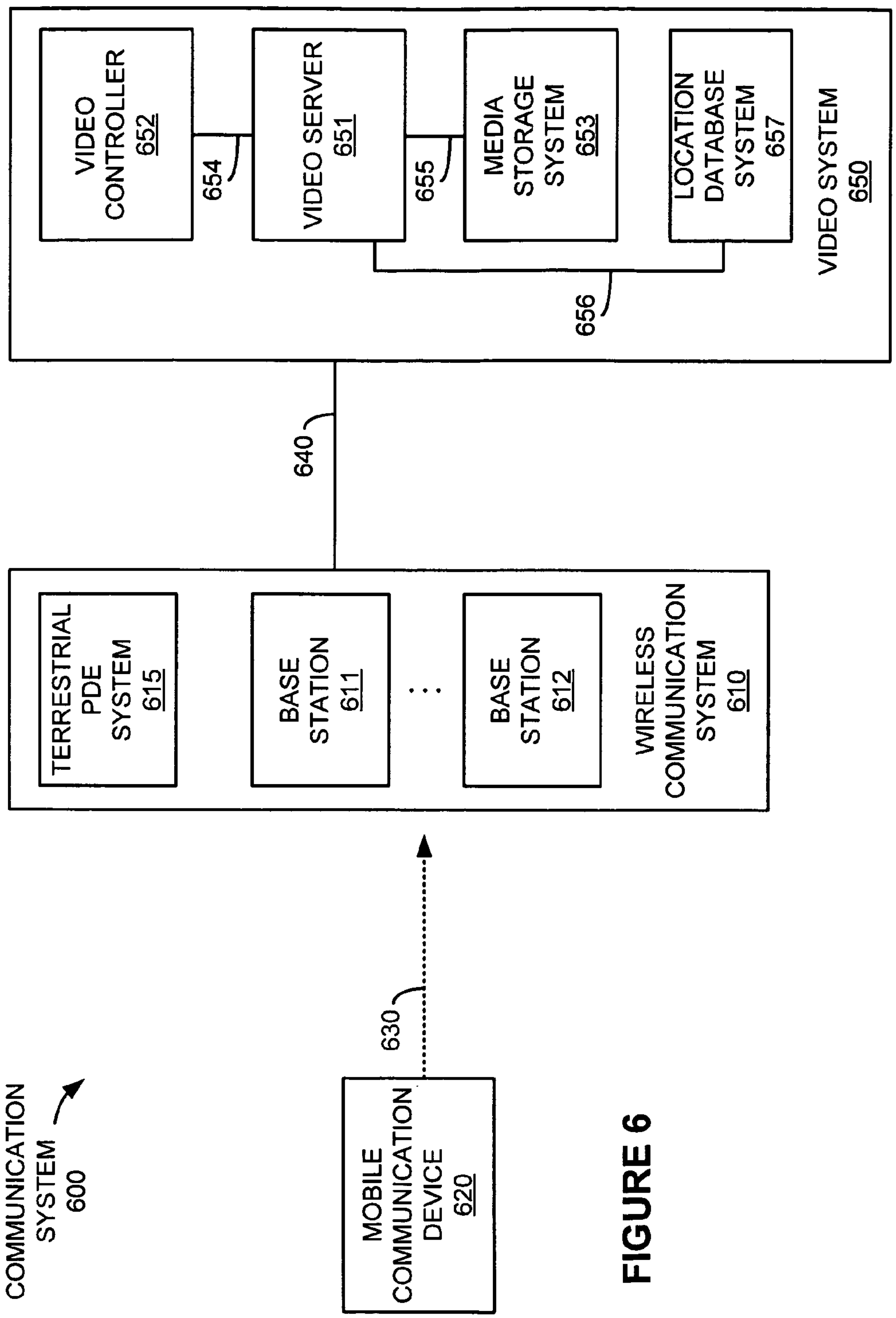
FIG. 6 is a system diagram illustrating a communication system.

FIG. 6 is a system diagram illustrating communication system 600. Communication system 600 includes mobile communication device 620, wireless communication system 610, and video system 650. Mobile communication device 620 and wireless communication system 610 communicate over wireless link 630. Video system 650 and wireless communication system 610 communicate over link 640.

Mobile communication device 620 comprises a smart phone capable of displaying video in this example. Wireless communication system 610 includes wireless communications network equipment capable of communicating with mobile communication device 620. As shown in FIG. 6, wireless communication system 610 includes base stations 611-612 and terrestrial position-determining equipment (PDE) system 615. In other examples, a different number of mobile communication devices and base stations may be located in communication system 600.

Video system 650 includes equipment capable of transferring or streaming video to mobile communication device 620. As shown in FIG. 6, video system 650 comprises video server 651, video controller 652, media storage system 653, and location database system 657. Video server 651 and video controller 652 are communicatively linked by link 654. Video server 651 and media storage system 653 are communicatively linked by link 655. Video server 651 and location database system 657 are communicatively linked by link 656. In some examples, video controller 652, media storage system 653, location database system 657, or links 654-656 are located within the same equipment in which video server 651 is located.

Video server 651 includes a data server for transferring video frames over wireless communication system 610 to mobile communication device 620. Video controller 652 includes equipment for controlling the operations of video server 651, and comprises a computer system. Media storage system 653 comprises a digital storage system for storing video frames and related content. In this example, media storage system 653 comprises a storage-area network (SAN) which stores a large collection of videos. Location database system 657 includes a database and a computer processing system including a digital storage medium, readable by a computer processing system, which stores the database thereon. The database includes information related to geographic areas associated with wireless communication system 610.

Links 654-656 comprise IP network links between video server 651 and video controller 652, video server 651 and media storage system 653, and video server 651 and location database system 657, respectively. Link 640 comprises a T1 connection between video system 650 and wireless communication system 610. Wireless link 630 uses the long-term evolution (LTE) protocol to exchange communications between mobile communication device 620 and wireless communication system 610.

As represented by the arrowhead of wireless link 630 in FIG. 6, mobile communication device 620 can exchange communications with base station 611 or base station 612, depending upon the location of mobile communication device 620. When mobile communication device 620 and base station 611 are in communication, wireless link 630 would link to base station 611, whereas when mobile communication device 620 and base station 612 are in communication, wireless link 630 would link to base station 612. This configuration is merely illustrative to show the capability of mobile communication device 620 to communicate with multiple base stations, with base station 612 being along a projected geographic path associated with mobile communication device 620. This configuration is discussed further below regarding FIGS. 7 and 8.

Terrestrial position determining equipment (PDE) 615 includes equipment capable of determining a geographic location of mobile communication device 620. Terrestrial PDE system could determine a position of mobile communication device 620 via a triangulation-based location, an emergency services location procedure, or by some other type of location determining method, including combinations thereof.

Figure 7:
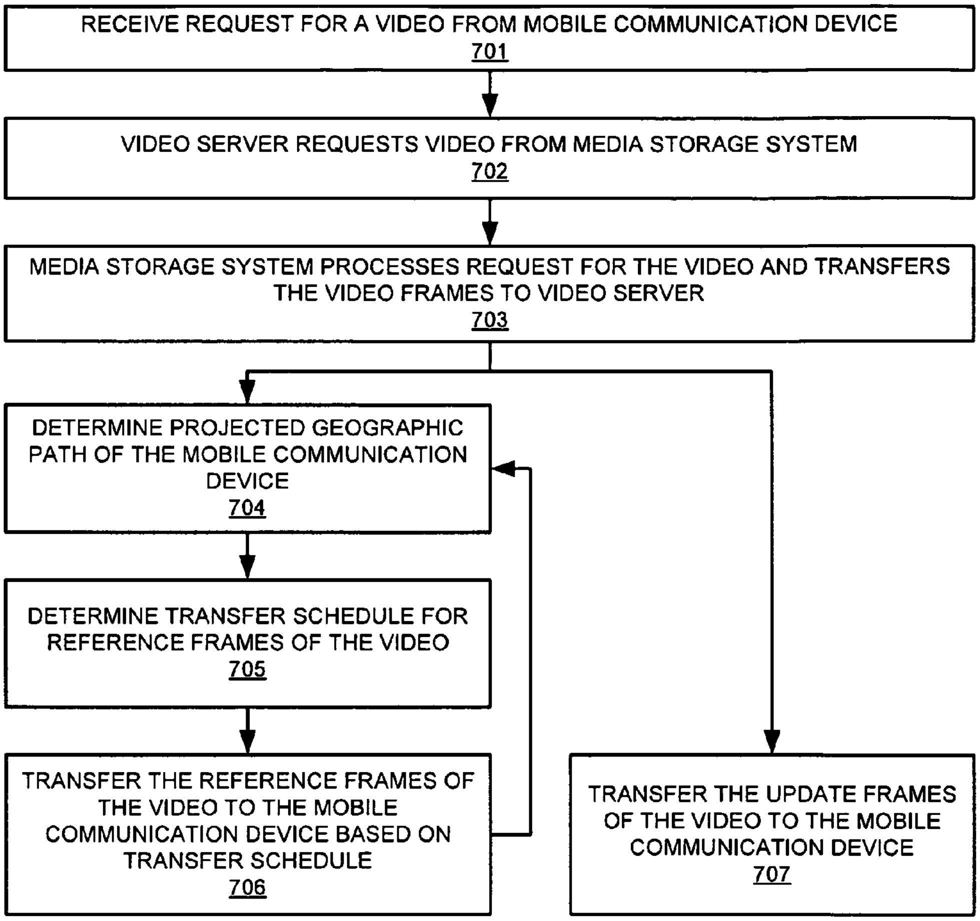
FIG. 7 is a flow diagram illustrating a method of operation of a communication system.

FIG. 7 is a flow diagram that illustrates a method of operation of communication system 600, as found in FIG. 6. The phases shown in FIG. 7 are indicated herein parenthetically. In FIG. 7, video system 650 receives (701) a request for a video from mobile communications device 620.

Video server 651 then requests (702) the video, as requested by mobile communication device 620, from media storage system 653. Media storage system 653 processes (703) the request for the video and begins to transfer the frames of the video to video server 651 over link 655.

Figure 8:
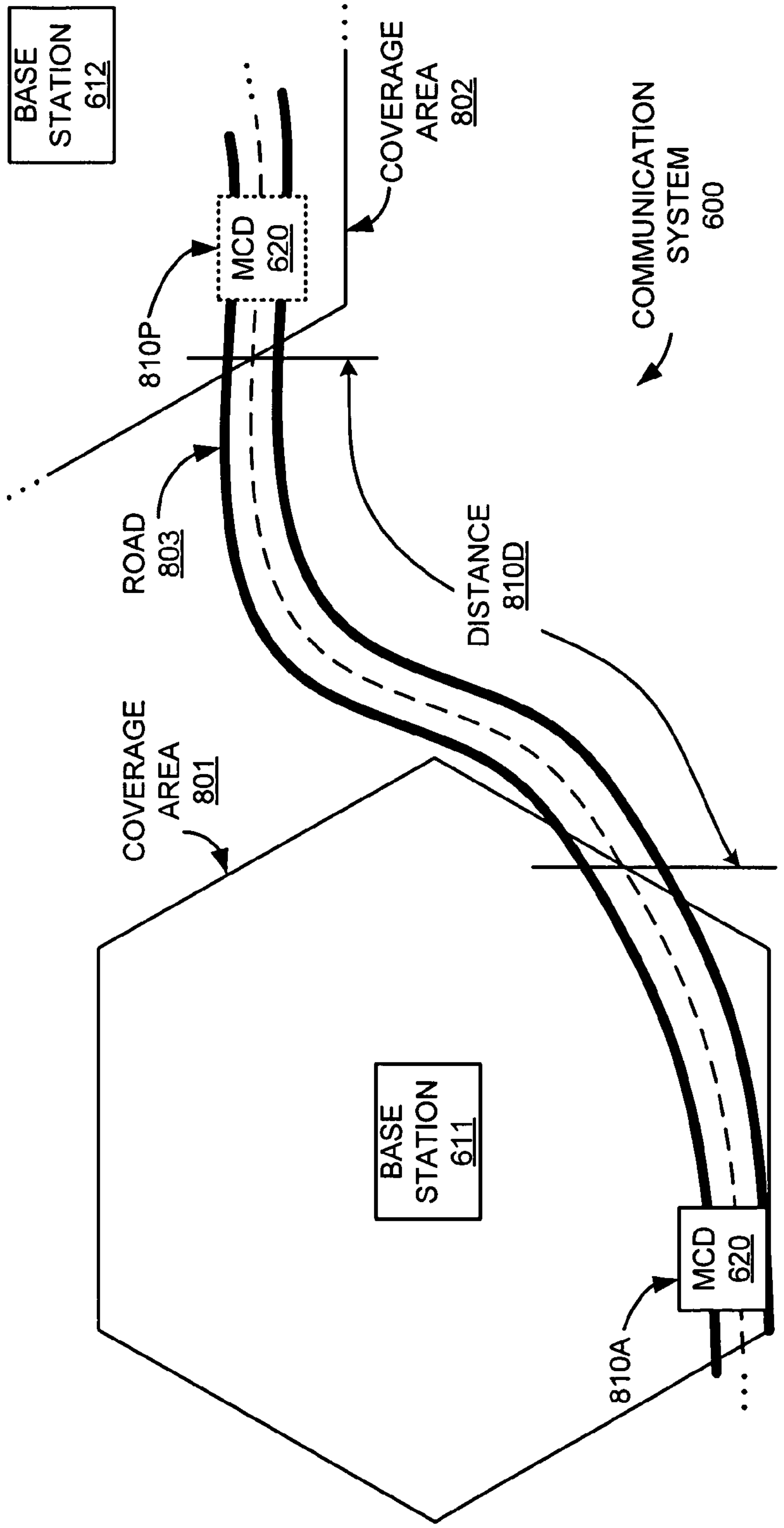
FIG. 8 is a diagram illustrating an overhead representation of a communication system.

Video system 650 determines (704) a projected geographic path of mobile communication device 620. In this example, the projected geographic path of mobile communication device 620 is determined by monitoring a geographic location of the mobile communication device. Then, the geographic location is processed to determine if the geographic location is associated with a mobility pattern. A projected geographic path of the mobile communication device is then determined based on the mobility pattern. In this example, the mobility pattern is associated with road 803, as shown in FIG. 8. A further discussion of the determination of the projected geographic path based on the mobility pattern of mobile communication device 620 is found below and illustrated in FIG. 8.

To determine if the geographic location of mobile communication device 620 is associated with a mobility pattern, location database system 657 could be queried with the geographic location. Location database system 657 could then transfer a response indicating if the geographic location is associated with a mobility pattern such as a road, land feature, or even past paths or trajectories followed by mobile communication device 620. As discussed above, location database system 657 includes a database and a computer processing system which stores information related to geographic areas and mobility patterns associated with wireless communication system 610 and mobile communication device 620. These geographic areas and mobility patterns could then correspond to geographic regions and paths which correspond to a certain bandwidth, signal strength, or other factors of wireless communications with mobile communication device 620. In this example, the mobility patterns denote regions within wireless communication system 610 that support a certain bandwidth of wireless communications.

In this example, video controller 652 requests the geographic location of mobile communication device 620 from terrestrial position-determining (PDE) system 615 in wireless communication system 610. In other examples, video controller 652 requests this geographic location from base station 611. In examples where more than one base station is located within wireless communication system 610, video controller 652 must first determine from which base station to request the geographic location. Video controller 652 could query another system in wireless communication system 610 to obtain an indicator as to which base station has information related to the geographic location of mobile communication device 620.

Video system 650 also determines (705) a transfer schedule for reference frames of a video based on the projected geographic path of mobile communication device 620. The transfer schedule indicates where along the projected geographic path the reference frames should be transferred and withheld to mobile communication device 620. A further discussion of the determination of the transfer schedule is found below and illustrated in FIG. 8.

The reference frames are then transferred (706) based on the transfer schedule to mobile communication device 620 over wireless communication system 610. Video system 650, concurrently, and without regard to the projected geographic path of mobile communication device 620, transfers (707) update frames of the video to mobile communication device 620.

In further examples of communication system 600, mobile communication device 620 receives the reference frames of the video when transferred by video system 650. Mobile communication device 620 also receives the update frames of the video transferred from video system 650. Mobile communication device 620 then displays both the reference frames and the update frames. Since the reference frames may be received in a different sequence with respect to the update frames, mobile communication device 620 may need to process the reference frames and the update frames and determine a playback sequence. In some examples, mobile communication device 620 stores the update frames in a buffer or cache while awaiting reference frames. As the reference frames are received, the update frames can then be transferred from the buffer and displayed in the correct sequence with the reference frames. An example of the relationship between reference frames and update frames is illustrated in FIG. 5.

During operation of video system 650, the process described above in phases 704-707 may be repeated throughout the transfer of a video. How frequently video system 650 determines (704) a projected geographic path of mobile communication device 620 will vary depending upon many factors, including the intentions of the operator of video system 650, the quality of video desired to be transferred, the availability of geographic location information, the SLA of the user of mobile communication device 620, the motion or path of mobile communication device 620, a deviation of mobile communication device 620 from a previously projected geographic path, among other factors.

FIG. 8 is a diagram illustrating an overhead representation of communication system 600, as found in FIG. 6. FIG. 8 includes mobile communication device (MCD) 620 and base stations 611-612, both also found in FIG. 6. Wireless communication system 610, video system 650, wireless link 630, and link 640 are not shown in FIG. 8 for clarity.

In FIG. 8, base stations 611-612 and MCD 620 can exchange wireless communications. Base stations 611-612 have a limited geographic range over which they can support a certain quality of communications with mobile communication devices. The limited range over which base station 611 can support a certain quality of communications with MCD 620 is indicated by coverage area 801 and the limited range over which base station 612 can support a certain quality of communications with MCD 620 is indicated by coverage area 802. In some examples, this limited range could be a function of the signal strength of base stations 611-612 or MCD 620, determined by the operator of wireless communication system 610 or video system 650, a function of the geographic location of base stations 611-612 or MCD 620, a limitation of the communication protocol employed, or some other factor. In other examples, the limited range could be defined by a region beyond which mobile communication devices must transmit with a high signal energy level to establish effective communications with base stations 611-612, where such a high signal energy level is determined to cause too much interference with a neighboring base station or other mobile communication devices in communication system 600.

FIG. 8 shows two geographic locations of MCD 620. First geographic location 810A represents an initial geographic location of MCD 620. Projected geographic location 810P represents a second geographic location of MCD 620, after MCD 620 traverses road 803. MCD 620 is within coverage area 801 when at first geographic location 810A. MCD 620 is within coverage area 802 when at projected geographic location 810P. When MCD 620 is outside of both coverage area 801 and coverage area 802, wireless communications between MCD 520 and the respective base station could, for example, occur at a lower bandwidth, whereas when in coverage area 801 or coverage area 802, wireless communications between MCD 620 and the respective base station could, for example, occur at a high bandwidth.

A mobility pattern, as discussed above, could be determined by processing first geographic location 810A and determining that the location is associated with road 803. The projected path of MCD 620 would then be determined to be localized to road 803, and consequently MCD 620 would leave coverage area 801, travel distance 810D, and encounter coverage area 802 to arrive at projected geographic location 810P. Further systems, databases such as location database system 657, or processing could be used to determine the existence and location of road 803. In other examples, more than one geographic location of MCD 620 could be determined in order to determine a direction and speed—aiding in the estimation of the transit time through the coverage areas on road 803.

Once the mobility pattern has been determined, a transfer schedule would be determined. The transfer schedule would incorporate the information associated with the mobility pattern to indicate when MCD 620 would be located in the various regions along road 803, including coverage area 801, distance 810D, and coverage area 802. The transfer schedule would also indicate when video system 650 should transfer and withhold reference frames to MCD 620. In this example, the reference frames would be transferred while MCD 620 was located in coverage area 801, in anticipation of transit through distance 810D between coverage areas. To ensure consistent playback of the video, enough reference frames would need to be transferred to and buffered in MCD 620 while in coverage area 801. When MCD 620 transits distance 810D and reference frames are withheld from transfer, enough reference frames are buffered in MCD 620 for playback until more reference frames could be transferred once MCD 620 reaches coverage area 802, as projected.

Although hexagonal regions, as defined by base station coverage areas 801-802, are shown in FIG. 8, it should be understood that the geographic regions could be of other configurations or of a different quantity, as determined by geographic features, empirical data, the desires of the operators of wireless communication system 610 or video system 650, or by other factors, including combinations thereof. In this example, it should be noted that coverage area 802 is of a similar size and shape as coverage are 801, but coverage area 802 spills off the page in FIG. 8 to illustrate distance 810D between coverage area 801 and coverage area 802.

Figure 9:
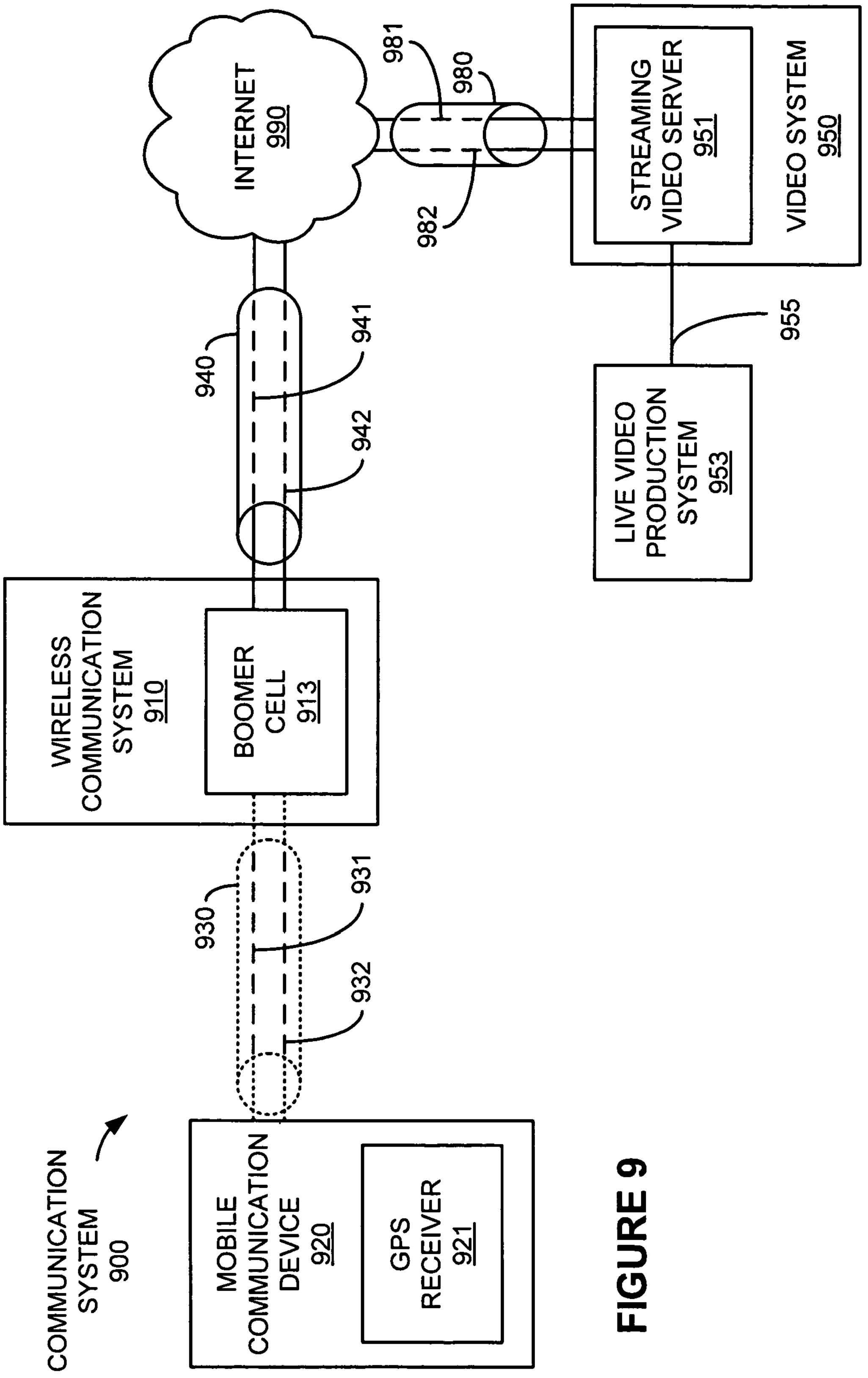
FIG. 9 is a system diagram illustrating a communication system.

FIG. 9 is a system diagram illustrating communication system 900. Communication system 900 includes mobile communication device 920, wireless communication system 910, video system 950, live video production system 953, and Internet 990. Mobile communication device 920 and wireless communication system 910 communicate over wireless link 930. Video system 950 and wireless communication system 910 communicate through Internet 990 over links 980 and 940. Wireless link 930 includes logical transport links 931-932. Link 940 includes logical transport links 941-942. Link 980 includes logical transport links 981-982.

Mobile communication device 920 comprises a wireless-enabled laptop computer capable of displaying video in this example. Mobile communication device 920 includes global-positioning system (GPS) receiver 921. GPS receiver 921 includes circuitry, processors, or equipment capable of determining a geographic location of mobile communication device 920.

Wireless communication system 910 includes wireless communications network equipment capable of communicating with mobile communication device 920. As shown in FIG. 9, wireless communication system 910 includes boomer cell 913. A boomer cell is an example of a base station tailored to service a high number of mobile communication devices over a large geographic area, such as a metropolitan area. In other examples, a different number of mobile communication devices and base stations may be located in communication system 900.

Video system 950 includes equipment capable of transferring or streaming video to mobile communication device 920. As shown in FIG. 9, video system 950 includes streaming video server 951. Streaming video server 951 includes a data server and routing equipment for transferring streaming video over Internet 990 and wireless communication system 910 to mobile communication device 920.

Live video production system 953 includes equipment associated with capturing, digitizing, compressing, and transferring live video from events such as sporting events or on-site news coverage. Streaming video server 951 and live video production system 953 are communicatively linked by link 955.

Link 955 comprises an IP network link between streaming video server 951 and live video production system 953. Links 940 and 980 comprise high-speed optical connections between video system 950, Internet 990, and wireless communication system 910. Wireless link 930 uses worldwide interoperability for microwave access (WiMAX) to exchange communications between mobile communication device 920 and wireless communication system 910.

Wireless link 930, link 940, and link 980 may comprise many different signals sharing the same link. As shown in FIG. 9, wireless link 930, link 940, and link 980 include several logical transport links. Wireless link 930 includes logical transport links 931-932. Link 940 includes logical transport links 941-942. Link 980 includes logical transport links 981-982. In this example, these logical transport links represent different IP socket pathways between the associated equipment.

Figure 10:
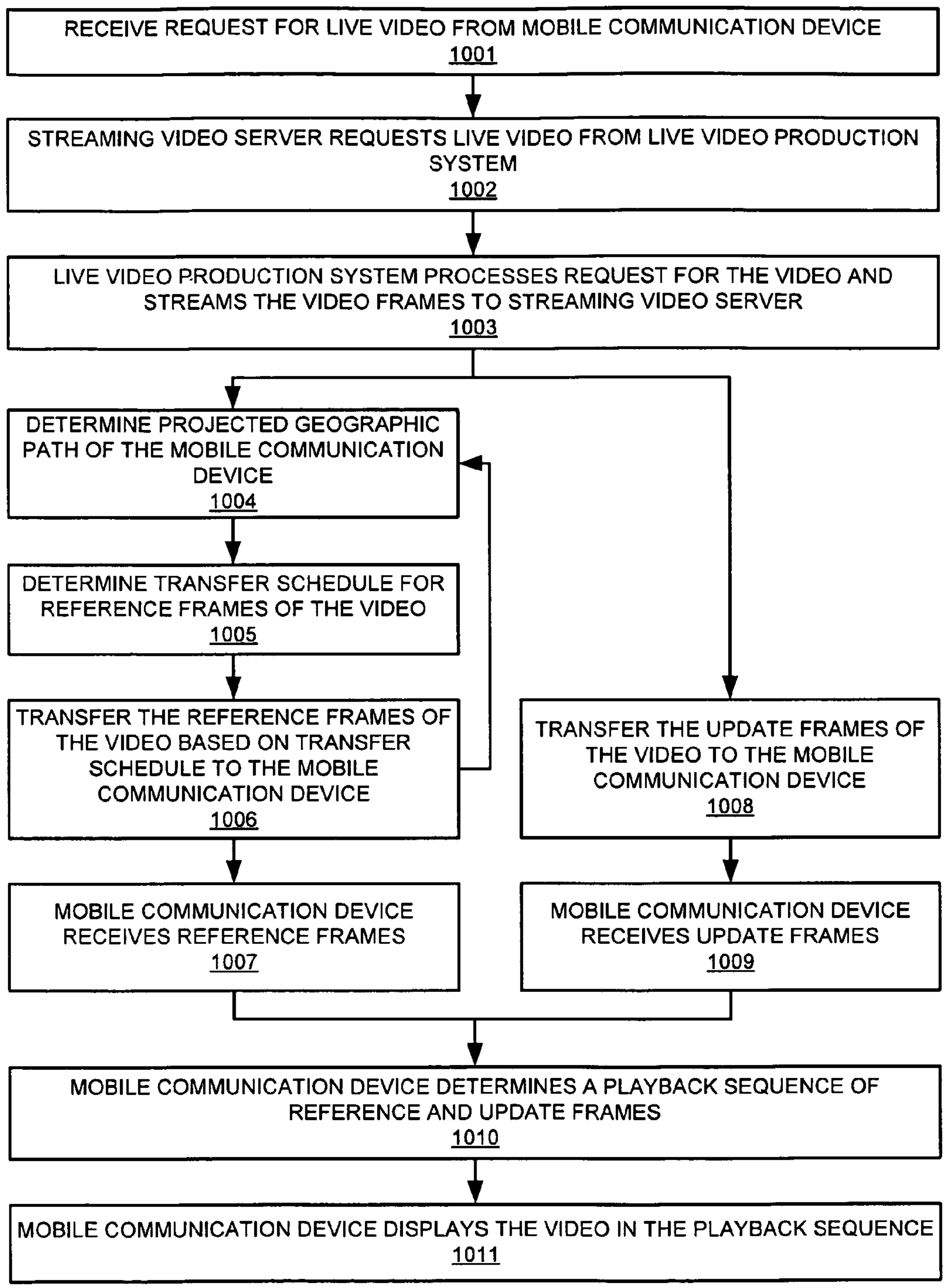
FIG. 10 is a flow diagram illustrating a method of operation of a communication system.

FIG. 10 is a flow diagram that illustrates a method of operation of communication system 900, as found in FIG. 9. The phases shown in FIG. 10 are indicated herein parenthetically. In FIG. 9, video system 950 receives (1001) a request for live video from mobile communications device 920.

Streaming video server 951 then requests (1002) the live video, as requested by mobile communication device 620, from live video production system 953. Live video production system 953 processes (1003) the request for the video and begins to stream the frames of the video to streaming video server 951 over link 955.

Live video production system 953 could include, in this example, equipment associated with capturing, digitizing, compressing, and transferring live video. However, in other examples, live video production system 953 transfers uncompressed and possibly analog video to streaming video server 951. Streaming video server 951 could be configured to digitize and/or compress the video for transport to mobile communication device 920. In yet other examples, although the video may be digitized and compressed prior to arrival in streaming video server 951, the video may undergo a format, compression, or encoding change in streaming video server 951 to place the video in a format compatible for decoding on mobile communication device 920.

Video system 950 determines (1004) a projected geographic path of mobile communication device 920. In this example, the projected geographic path of mobile communication device 920 is determined by monitoring a first geographic location of mobile communication device 920 and monitoring a second geographic location of mobile communication device 920. Then, the first geographic location and the second geographic location are processed to determine a traveled path between the first geographic location and the second geographic location. The traveled path is extrapolated to determine the projected geographic path. A further discussion of the determination of the projected geographic path based on the traveled path of mobile communication device 920 is found below and illustrated in FIG. 11.

In this example, video system 950 requests the geographic locations from mobile communication device 920. In other examples, mobile communication device 920 provides an initial geographic location with the request for video, and subsequent geographic locations at a later time. Mobile communication device 920 includes global-positioning system (GPS) receiver 921 in this example, which determines the geographic location of mobile communication device 920.

Video system 950 also determines (1005) a transfer schedule for reference frames of a video based on the projected geographic path of mobile communication device 920. The transfer schedule indicates where along the projected geographic path the reference frames should be transferred to mobile communication device 920. A further discussion of the determination of the transfer schedule is found below and illustrated in FIG. 11.

Streaming video server 951 transfers the reference frames (1006) based on the transfer schedule to mobile communication device 920 over wireless communication system 910. The reference frames could be transferred over logical transport link 981 between streaming video server 951 and Internet 990, over logical transport link 941 between Internet 990 and boomer cell 913, and over logical transport link 931 between boomer cell 913 and mobile communication device 920.

Streaming video server 951, concurrently, and without regard to the projected geographic path of mobile communication device 920, transfers (1008) update frames of the video to mobile communication device 920. The update frames could be transferred over logical transport link 982 between streaming video server 951 and Internet 990, over logical transport link 942 between Internet 990 and boomer cell 913, and over logical transport link 932 between boomer cell 913 and mobile communication device 920. It should be understood that other conditions on the transfer of the update frames could be utilized, such as when mobile communication device 920 is out of communication range of wireless communication system 910, when mobile communication device 920 is powered off, when faults are detected on wireless link 930, link 940, or link 980, among other conditions—including combinations thereof.

Mobile communication device 920 receives (1007) the reference frames of the video when transferred by streaming video server 951. Mobile communication device 920 also receives (1009) the update frames of the video transferred from streaming video server 951. Since the reference frames may be received in a different sequence with respect to the update frames, mobile communication device 920 may need to process the reference frames and the update frames and determine (1010) a playback sequence. In some examples, mobile communication device 920 stores some of the frames in a buffer or cache while awaiting other frames. As the various frames are received, the frames can then be transferred from the buffer and displayed (1011) in the correct sequence. The relationship between reference frames and update frames is illustrated in FIG. 5, as discussed above.

In other examples, mobile communication device 920 monitors a playback quality of the video and transfers an indicator of the playback quality to streaming video server 951. Streaming video server 951 could then transfer this indication of playback quality to possibly a location database system along with the geographic location of mobile communication device 920. In this manner, a location database system could be configured to create a database of geographic regions of different playback quality. Advantageously, involvement of wireless communication system 910 would not be needed for the operator of video system 950 to create a database, or even a map, indicating which geographic locations within wireless communication system 910 correspond to high quality video playback. In other examples, the database could be predetermined based upon information from the operator of wireless communication system 910 and the indicator of playback quality could be used to update or refine the database in the location database system.

During operation of video system 950, the process described above in phases 1004-1009 may be repeated throughout the transfer of a video. How frequently video system 950 determines (1004) a projected geographic path of mobile communication device 920 will vary depending upon many factors, including the intentions of the operator of video system 950, the quality of video desired to be transferred, the availability of geographic location information, the SLA of the user of mobile communication device 920, the motion or path of mobile communication device 920, among other factors.

Figure 11:
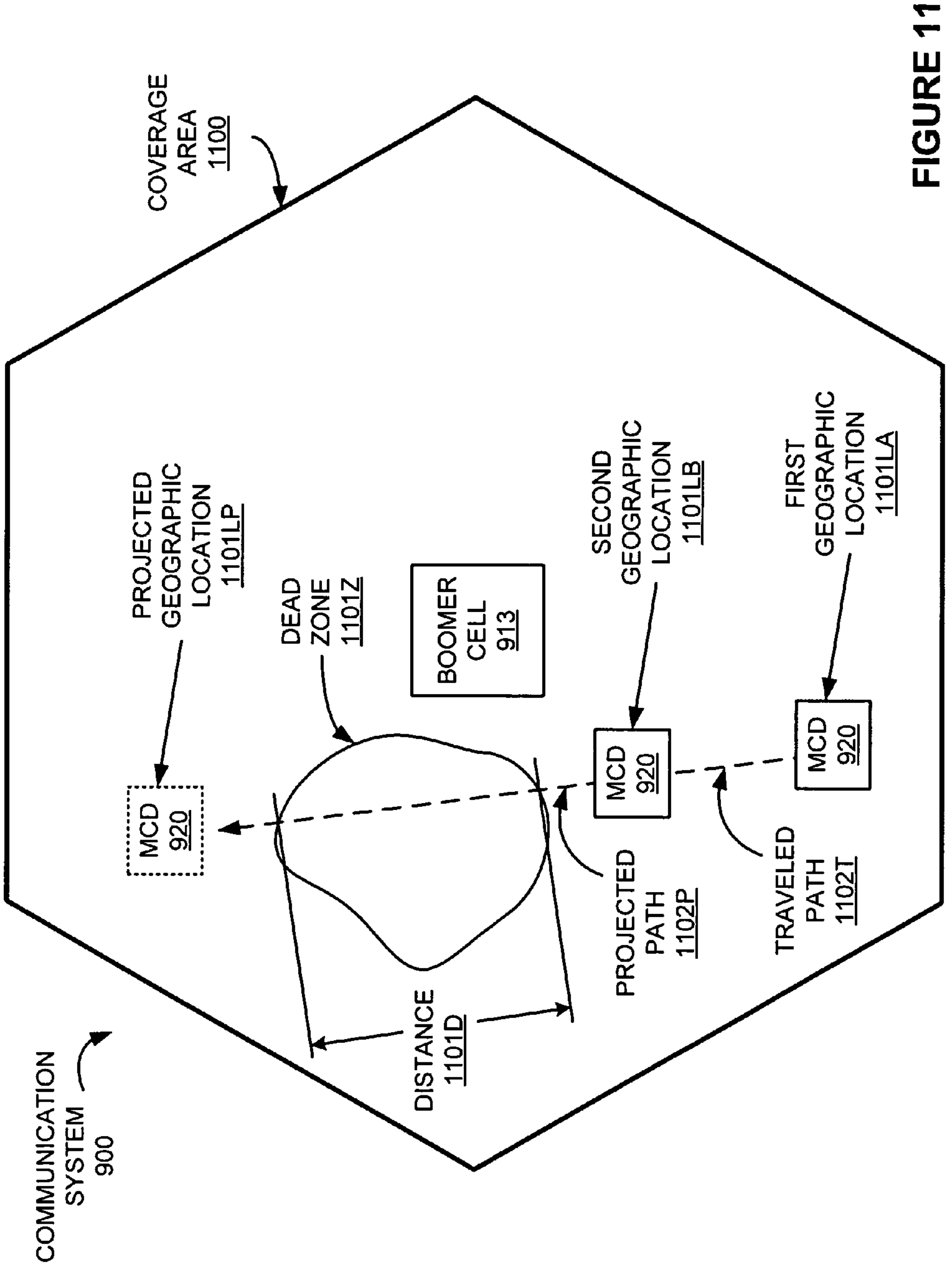
FIG. 11 is a diagram illustrating an overhead representation of a communication system.

FIG. 11 is a diagram illustrating an overhead representation of communication system 900, as found in FIG. 9. FIG. 11 includes mobile communication device (MCD) 920 and boomer cell 913, both also found in FIG. 9. Wireless communication system 910, video system 950, wireless link 930, Internet 990, live video production system 953, and links 940, 955, and 980 are not shown in FIG. 11 for clarity.

As shown in FIG. 11, MCD 920 and boomer cell 913 can exchange wireless communications. Boomer cell 913 has a limited geographic range over which it can support communications with MCD 920. The limited range over which boomer cell 913 can support communications with mobile communication devices is indicated by coverage area 1100. In this example, the limited range is a function of the limitations of the WiMAX communication protocol employed.

FIG. 11 also shows three geographic locations of MCD 920. First geographic location 1101A represents an initial geographic location of MCD 920. Second geographic location 1101B represents a subsequent geographic location of MCD 920 after traversing a geographic distance, denoted by traveled path 1102T. Projected geographic location 1101P represents a third geographic location of MCD 920, after MCD 920 traverses projected path 1102P. MCD 920 is within coverage area 1101 at all three geographic location in this example. However, for a portion of projected path 1102P, MCD 920 passes through dead zone 1101Z, as defined by distance 1101D along projected path 1102P.

Dead zone 1101Z represents a region within coverage area 1100 capable of low quality wireless communications between MCD 920 and boomer cell 913. In some examples, the bandwidth or signal strength of wireless communications are lower inside dead zone 1101Z, while in other examples, wireless communications are entirely difficult or non-existent within dead zone 1101Z. When MCD 920 is located inside dead zone 1101Z, wireless communications between MCD 920 and boomer cell 913 could, for example, occur at a low bandwidth, whereas when outside dead zone 1101Z (but still within coverage area 1100), wireless communications between MCD 920 and boomer cell 913, for example, occur at a high bandwidth. Further systems, databases, or processing could be used to determine the existence and location of dead zone 1101Z.

Once projected path 1102P has been determined, a transfer schedule would be determined. The transfer schedule would incorporate the information associated with projected path 1102P to indicate when MCD 920 would be located in the various regions along projected path 1102P; these regions include coverage area 1100 and dead zone 1101Z. The transfer schedule would also indicate when video system 950 should transfer and withhold reference frames of the video to MCD 920.

In an example operation of the transfer schedule, video system 950 would determine that MCD 920 would be in a region of high bandwidth along projected path before progressing into a region of low bandwidth (dead zone 1101Z). The reference frames could then be scheduled to be burst to MCD 920 in a manner more rapid than normal, and possibly out of sequence with the update frames, before MCD 920 is expected to arrive in dead zone 1101Z. MCD 920 could then buffer or cache the reference frames. Then, when MCD 920 arrives in dead zone 1101Z, the lower bandwidth in dead zone 1101Z—which may not allow for effective transfer of the generally larger reference frames—could be compensated for in an efficient manner. The reference frames would not be scheduled for transfer to MCD 920 for distance 1101D along projected path 1102P. However, the generally smaller update frames would be transferred to MCD 920 without regard to dead zone 1101Z. Advantageously, efficient use of the limited bandwidth along distance 1101D of projected path 1102P is achieved while still maintaining a consistent transfer of video frames to MCD 920. When MCD 920 moves beyond dead zone 1101Z, possibly to projected geographic location 1101P, the transfer of the reference frames could resume or be burst as described above in anticipation for further dead zones or for a path beyond coverage area 1100.

Although a hexagonal region, as defined by boomer cell coverage area 1100, and a generally circular dead zone 1101Z, are shown in FIG. 11, it should be understood that the geographic regions could be of other configurations or of a different quantity, as determined by geographic features, empirical data, the desires of the operators of wireless communication system 910 or video system 950, or by other factors, including combinations thereof.

Advantageously, a video system configured as described herein can provide a higher quality of video service and possibly better user experience over wireless links where the quality of wireless communications can vary when a mobile communication device transits across geographic locations. Since, in many of the examples included herein, reference frames are transferred separately from update frames, and the reference frames are only transferred when the quality of the wireless link between a mobile communication device and a wireless communication system can support, for example a certain bandwidth, a mobile communication device can buffer up the generally smaller update frames separately from the generally larger reference frames. When the quality of the wireless link, as defined by geographic location, allows for transfer of the reference frames, the video server can then transfer these generally larger reference frames, making efficient use of the resources of the wireless link. In order to achieve this transfer of reference frames at a correct location or time, a transfer schedule is determined which allows for a burst transfer of reference frames while a mobile communication device is in a region of high quality wireless coverage, while withholding the transfer of reference frames while the mobile communication device is in a region of low quality wireless coverage. Thus, the a burst of the reference frames will transfer according to the transfer schedule and remain buffered in the mobile communication device until needed, while the generally smaller bandwidth—and more frequent—update frames are always transferred. In many examples of compressed video, many more update frames are required than reference frames for each second of video. Advantageously, a method of operation described herein could allow a mobile communication device traveling through areas of various quality of wireless coverage to weather periods of poor wireless quality while still maintaining a high-quality of video performance.

In a mobile communication device, the reference frames and the update frames are then re-sequenced according to a desired playback sequence and displayed. In such a manner, a compressed video can be transferred from a video server to a mobile communication device over a wireless communication system in a more efficient manner resulting in a better user experience and possibly higher or more consistent frame transfer and/or playback rates of the video.

In addition to, or alternatively from the separate transfer of reference frames and update frames, other methods may be employed to make more efficient use of the changing bandwidth capabilities of a wireless link based upon a projected geographic path. For example, when the projected geographic path indicates anticipated quality levels of wireless communications between a mobile communication device and a wireless communication system, the video transferred from a video server could comprise a different format, encoding scheme, or resolution, among other changes. A video server could possibly request this different video format from a media storage system in some examples. Advantageously, by sending a lower resolution video format in regions of lower quality wireless communications, more efficient use of the available wireless bandwidth could be made while still maintaining the user experience and keeping the frame transfer rate at a desired level. In other examples, a different and possibly more lossy video compression scheme could be used in regions of lower quality wireless communication to achieve a similar effect.

FIGS. 1-11 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a video system comprising:

determining a projected geographic path of a mobile communication device;

providing a video comprising a sequence of reference frames and update frames;

determining a transfer schedule for reference frames of the video based on the projected geographic path;

transferring the reference frames of the video out of the sequence based on the transfer schedule for delivery to the mobile communication device over a wireless communication system;

transferring the update frames of the video for delivery to the mobile communication device over the wireless communication system without regard to the projected geographic path.

2. The method of operating the video system of claim 1, wherein determining the transfer schedule for the reference frames comprises processing the projected geographic path and a service-level agreement of the mobile communication device to determine the transfer schedule for the reference frames; and further comprising:

processing the service-level agreement of the mobile communication device to determine a bit rate to transfer the reference frames, and transferring the reference frames with at least the bit rate based on transfer schedule.

3. The method of operating the video system of claim 1, wherein determining the projected geographic path comprises:

monitoring a first geographic location of the mobile communication device;

monitoring a second geographic location of the mobile communication device;

processing the first geographic location and the second geographic location to determine a traveled path between the first geographic location and the second geographic location;

extrapolating the traveled path to determine the projected geographic path.

4. The method of operating the video system of claim 3, wherein monitoring the first geographic location comprises receiving the first geographic location from the mobile communication device, and wherein monitoring the second geographic location comprises receiving the second geographic location from the mobile communication device.

5. The method of operating the video system of claim 3, wherein monitoring the first geographic location comprises receiving the first geographic location from the wireless communication system, and wherein monitoring the second geographic location comprises receiving the second geographic location from the wireless communication system.

6. The method of operating the video system of claim 1, wherein determining the projected geographic path comprises:

monitoring a geographic location of the mobile communication device;

processing the geographic location to determine if the geographic location is associated with a mobility pattern;

determining the projected geographic path of the mobile communication device based on the mobility pattern.

7. The method of operating the video system of claim 6, wherein the mobility pattern is a road.

8. The method of operating the video system of claim 1, wherein the reference frames of the video comprise MPEG I-frames and the update frames of the video comprise at least one of MPEG P-frames and MPEG B-frames.

9. The method of operating the video system of claim 1, further comprising:

in the mobile communication device, receiving the reference frames and the update frames of the video over the wireless communication system; and in the mobile communication device, displaying the video.

10. The method of operating the video system of claim 1, further comprising:

in the mobile communication device, monitoring a playback quality of the video and transferring an indicator of the playback quality to the video server over the wireless communication system.

11. A method of operating a video system, comprising:

in a video server, receiving a request for a video comprising a sequence of reference frames and update frames from a mobile communication device over a wireless communication system;

in the video server, requesting the video from a media storage system;

in the media storage system, processing the request for the video and transferring the video to the video server;

in the video server, determining a projected geographic path of the mobile communication device;

in the video server, determining a transfer schedule for the reference frames of the video based on the projected geographic path;

in the video server, transferring the reference frames of the video out of the sequence based on the transfer schedule for delivery to the mobile communication device over the wireless communication system;

in the video server, transferring the update frames of the video for delivery to the mobile communication device over the wireless communication system without regard to the projected geographic path.

12. The method of operating the video system of claim 11, wherein determining the transfer schedule for the reference frames comprises processing the projected geographic path and a service-level agreement of the mobile communication device to determine the transfer schedule for the reference frames; and further comprising:

in the video server, processing the service-level agreement of the mobile communication device to determine a bit rate to transfer the reference frames, and transferring the reference frames with at least the bit rate based on the transfer schedule.

13. The method of operating the video system of claim 11, wherein determining the projected geographic path comprises:

monitoring a first geographic location of the mobile communication device;

monitoring a second geographic location of the mobile communication device;

processing the first geographic location and the second geographic location to determine a traveled path between the first geographic location and the second geographic location;

extrapolating the traveled path to determine the projected geographic path.

14. The method of operating the video system of claim 11, wherein determining the projected geographic path comprises:

monitoring a geographic location of the mobile communication device;

processing the geographic location to determine if the geographic location is associated with a mobility pattern;

determining the projected geographic path of the mobile communication device based on the mobility pattern.

15. The method of operating the video system of claim 14, wherein the mobility pattern is a road.

16. The method of operating the video system of claim 11, further comprising:

in the mobile communication device, receiving the reference frames and the update frames of the video over the wireless communication system; and in the mobile communication device, displaying the video.

17. The method of operating the video system of claim 11, further comprising:

in the mobile communication device, monitoring a playback quality of the video and transferring an indicator of the playback quality to the video server over the wireless communication system.

18. The method of operating the video system of claim 11, wherein the reference frames of the video comprise MPEG I-frames and the update frames of the video comprise at least one of MPEG P-frames and MPEG B-frames.

19. The method of operating the video system of claim 11, wherein transferring the reference frames comprises transferring the reference frames over a first logical transport link;

wherein transferring the update frames comprises transferring the update frames over a second logical transport link; and further comprising:

in the mobile communication device, receiving the reference frames of the video over the first logical transport link and the update frames of the video over the second logical transport link and determining a playback sequence among the reference frames of the video and the update frames of the video.

20. The method of operating the video system of claim 19, wherein the first logical transport link comprises a first transportation port of the mobile communication device and the second logical transport link comprises a second transportation port of the mobile communication device.

21. A communication system comprising:

a video system configured to receive a request for a video comprising a sequence of reference frames and update frames from a mobile communication device;

the video system configured to determine a projected geographic path of the mobile communication device;

the video system configured to determine a transfer schedule for the reference frames of the video based on the projected geographic path;

the video system configured to transfer the reference frames of the video out of the sequence based on the transfer schedule for delivery to the mobile communication device over a wireless communication system;

the video server configured to transfer the update frames of the video for delivery to the mobile communication device over the wireless communication system without regard to the projected geographic path;

the mobile communication device configured to receive the reference frames and the update frames, process the reference frames and the update frames to determine a playback sequence of the video, and display the video in the playback sequence.

22. The communication system of claim 21, wherein the video system is configured to process the projected geographic path and a service-level agreement of the mobile communication device to determine the transfer schedule for the reference frames, process the service-level agreement of the mobile communication device to determine a bit rate to transfer the reference frames, and transfer the reference frames with at least the bit rate based on the transfer schedule.

23. The communication system of claim 21, wherein the video system is configured to monitor a first geographic location of the mobile communication device, monitor a second geographic location of the mobile communication device, process the first geographic location and the second geographic location to determine a traveled path between the first geographic location and the second geographic location, and extrapolate the traveled path to determine the projected geographic path.

24. The communication system of claim 23, wherein the video system is configured to receive the first geographic location from the mobile communication device and receive the second geographic location from the mobile communication device.

25. The communication system of claim 21, wherein the video system is configured to monitor a geographic location of the mobile communication device, process the geographic location to determine if the geographic location is associated with a mobility pattern, and determine the projected geographic path of the mobile communication device based on the mobility pattern.

* * * * *